May 6, 1958  S. A. BORNSTEIN  2,833,341
POSTURE CUSHION FOR MOTOR VEHICLES
Filed Sept. 19, 1956

Inventor
Samuel A. Bornstein
by Roberts Cushman & Grover
Attys

United States Patent Office 2,833,341
Patented May 6, 1958

2,833,341
POSTURE CUSHION FOR MOTOR VEHICLES

Samuel A. Bornstein, Waltham, Mass.

Application September 19, 1956, Serial No. 610,815

3 Claims. (Cl. 155—182)

This invention pertains to cushions, more especially to a cushion designed to rest upon and to supplement the seat of a motor vehicle for the purpose of lessening the muscular strain and the fatigue incident to long periods of driving.

The designers of most vehicle seats, apparently in disregard of the differences in the conditions of use, have followed a custom, common in the manufacture of household furniture, of making the bottom and back rest portions of the seat as independent parts. Moreover, according to usual upholstery practice, they usually make each of the parts by stretching a piece of fabric, for example, textile material, tightly about a pad which is thicker at its central portion than at its edges, with the result that the exposed surfaces of the bottom and back rest portions of the seat are convex. At the angle where the bottom and back rest portions meet there is thus formed a transversely extending recess which converges rearwardly and downwardly. Manifestly, the surfaces thus provided for contact with the body of a person occupying the seat do not conform at all closely with the contours of those portions of the human anatomy which the seat is designed to support. These differences in contour may not be of substantial importance in a chair for household use, since the person occupying such a chair is normally quiescent and the forces exerted between the surfaces of the chair and the body are for the most part static. However, when a motor vehicle starts or increases in speed the body of a person occupying the vehicle seat must be accelerated and such acceleration of the rider's body must be produced by pressure forces exerted by the bottom and back rest portions of the vehicle seat. Obviously, when the contours of these portions of the seat do not conform closely with those of the rider's body, the accelerating forces are concentrated at those areas where contact is actually made, thus placing undue stress upon relatively small areas of the body, and the fatigue and weariness experienced by motorists is doubtless due largely to muscular tension which attends the unconscious effort of the driver or passenger to brace himself against displacement as the vehicle speeds up or changes its direction of motion.

While independent cushions which are more or less triangular shape are on the market and which are intended to be placed between the rider's back and the back rest portion of the seat in order to relieve fatigue, such cushions easily shift in position relatively to the vehicle seat and the driver's body and fail adequately to distribute the pressure and doubtless for this reason have not come into more general use.

A principal object of the present invention is to provide a cushion for use with the conventional vehicle seat and which has a contour such as to conform closely to that of the human body and likewise to conform closely to the contour of the bottom and back portions of the vehicle seat, so that the pressure forces between the seat and the rider's body will be distributed with substantial uniformity. A further object is to provide a cushion so designed that the bottom and back rest portions merge smoothly and are contoured to provide a rearwardly concave shallow cavity providing adequate support for the sacral portion of the rider's body. A further object is to provide a cushion for use with the conventional motor vehicle seat, having surfaces shaped to conform closely to the exposed surfaces of the bottom and back rest portions of the seat so that the cushion tends to remain in the desired position of use and does not readily slip either forwardly or from side to side. A further object is to provide a correct posture cushion for use on the conventional motor vehicle seat and which is itself of a resilient material, thereby enhancing the comfort of the rider, but which at the same time is of shape retaining character so that it will not sag nor become misshapen after a substantial period of use, and without requiring that it be provided with rigid stiffening elements or be attached by supporting means to the back member of the seat. Other and further objects and advantages of the invention will be pointed out in the following more detailed description and by reference to the accompanying drawings wherein:

Figure 5:
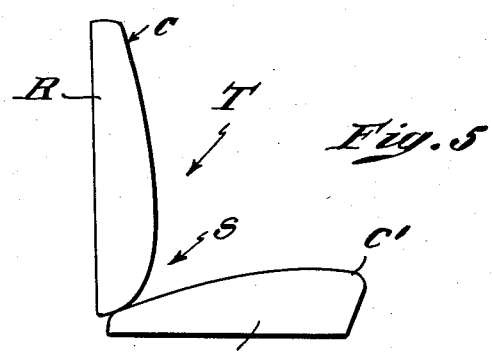
Fig. 5 is a diagram illustrative of the customary contour, in front to rear vertical section, of a conventional motor vehicle seat.

Referring to Fig. 5 of the drawings there is diagrammatically indicated a vehicle seat T comprising a back rest portion R and the bottom portion B. Following customary practice the exposed forward surface C of the back rest is convex and the exposed or upper surface C' of the bottom portion is likewise convex. Because of this contour of the back rest and bottom portions, there is formed a recess S (Fig. 5) extending transversely across the seat where the back rest and bottom portions approach each other, this recess being convergent downwardly and rearwardly.

Figure 3:
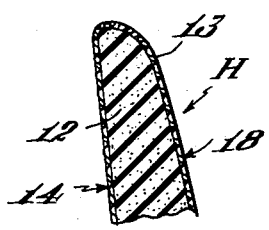
Fig. 3 is a fragmentary sectional view to larger scale than Fig. 1 and substantially on the line 3—3 of Fig. 2, showing one preferred method of making the cushion.
Figure 4:
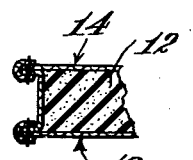
Fig. 4 is a fragmentary section on the line 4—4 of Fig. 1.

The cushion H (Fig. 1) embodying the present invention is designed to rest upon the upper surface of the bottom portion B of the vehicle seat and to contact the forward surface of the back rest R of the seat and substantially to fill the recess S. This cushion H, in transverse front-to-rear section is of generally L-shape, comprising the upright leg 10 and the substantially horizontal leg 11. Merely as illustrative of dimensions which have been found desirable, the front to rear width of the top surface of the horizontal leg may be approximately eighteen inches, and the height of the forward face of the vertical leg may be approximately twenty inches. As shown, by way of example, in Figs. 3 and 4 this cushion may comprise a unitary core portion 12 suitably shaped by a molding operation from a moldable material. Such a material may, for example, be foam rubber which after molding is resiliently yieldable. However, the material employed should be of self-sustaining character so that no internal framework is required to maintain its shape, nor should it be necessary to secure the upright leg 10 to the back rest of the seat in order to prevent the upright leg from sagging. As illustrated in Fig. 3 the core 12 is encased in an outer covering 13 which may, for example, be of textile material or a suitable plastic. However, it is contemplated that the process of molding and the character of the core material may be such that the molding operation results in the formation of an outer skin or integument which is sufficiently smooth and of so pleasing or ornamental appearance that no separate covering may be required.

In molding the core, the rear surface 14 of the upright leg and the upper surface 15 of the horizontal leg of the cushion are so contoured, for example, by giving them a concave curvature that they fit snugly against the convex surfaces C and C' respectively of the vehicle seat, these concave surfaces 14 and 15 merging in a transversely extending acute edge 16, and thereby defining a filler 17, of generally triangular shape in front-to-rear section, for the recess S where the back rest and bottom members of the vehicle seat meet.

Figure 2:
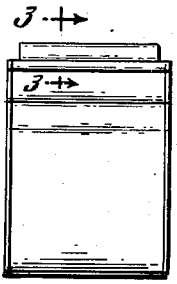
Fig. 2 is a plan view to smaller scale than Fig. 1 of the cushion illustrated in Fig. 1 but omitting the vehicle seat.
Figure 1:
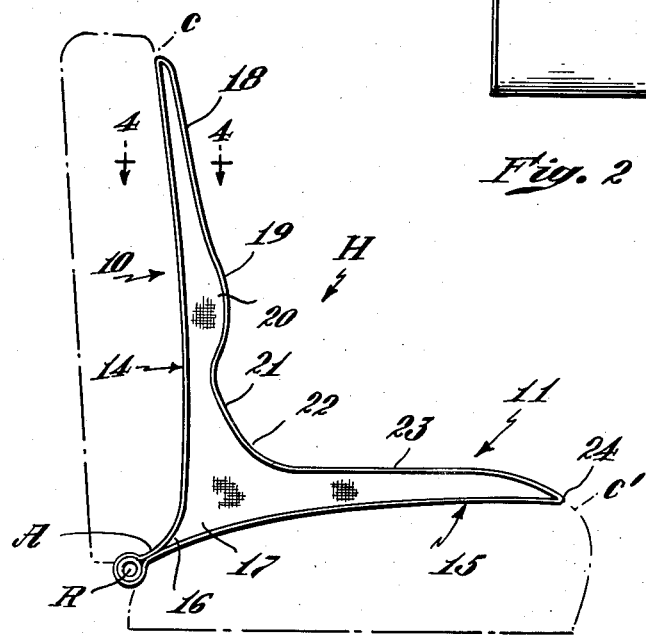
Fig. 1 is a side elevation of a cushion embodying the present invention and illustrating the manner in which it is positioned during use, the bottom and back rest portions of a vehicle seat being indicated in broken lines.

The upper portion 18 of the forward exposed surface of the upright leg of the cushion is here shown, in Fig. 1, as substantially flat and sloping forwardly and downwardly from the upper edge of the cushion, but merging with a forwardly convex surface 19 extending transversely across the cushion, and which forms the exposed surface of a transversely extending ridge 20 having a smoothly curved forward surface, and which is designed to fit snugly into the small of the back of the user. Below this ridge 20 the forward exposed surface of the upright leg of the cushion merges with a concavely curved surface 21 defining a shallow recess or cavity 22 for the reception of the sacral portion of the user's anatomy, the surface 21 then merging with the upper and generally horizontal surface 23 of the horizontal leg of the cushion. This upper surface 23 in turn intersects the lower surface 15 of the horizontal leg at a transversely extending acute edge 24, the curvature of the forward marginal portion of the upper surface of the horizontal leg of the cushion being such that said upper surface merges smoothly and without substantial interruption with the forward portion of the upper surface C' of the vehicle seat. It is evident that the concave surface 22 forms the base of the triangular filler 17, while the lower part of the surface 14 and the rear part of the surface 15 form those faces of the triangular filler which intersect at 16 to form the apex of the triangle.

Although by reason of the shape of the rear and bottom surfaces of this cushion, the cushion fits very snugly against the back rest and bottom member of the vehicle seat and has little tendency to slip either forwardly or sidewise, nevertheless, if desired, the cushion may be provided with an attaching tape A which may be passed between the lower edge of the back rest of the seat and the rear end of the bottom member of the seat and secured in any desired manner as by a rod R for anchoring the cushion in place.

While foam rubber has been suggested as a suitable material it is contemplated that other materials may be used in making the cushion, for example, rubberized hair or cotton suitably treated, and that any other appropriate material may be employed for the purpose.

In the use of the device the user places the cushion upon the vehicle seat as illustrated in Fig. 1 and then seats himself upon the surface 23 of the lower leg of the cushion, and in leaning back against the upright leg of the cushion finds support for the entire area of the lower portion of his back, so that when the vehicle is accelerated, either in starting or during travel, the force requisite to accelerate the rider's body is distributed substantially uniformly over the entire area of the lumbar and sacral portions of his back, thus relieving the muscles of much of the strain and fatigue incident to the driving of a motor vehicle for long distances such as occur when the rider is seated upon the customary seat.

While one desirable embodiment of the invention has herein been disclosed by way of example it is to be understood that the invention is broadly inclusive of any and all modifications falling within the scope of the appended claims.

I claim:

1. A cushion for use with a motor vehicle seat of the kind which comprises a bottom portion and a back rest, the exposed surfaces of both back rest and bottom portion being convexly curved and at their point of adjacency defining a recess which converges rearwardly and downwardly, the cushion having concavely curved rear and bottom surfaces designed to fit snugly against the exposed surface of the back rest and bottom portions of the vehicle seat respectively, said concavely curved surfaces of the cushion converging to define the apex of a substantially triangular part which fills the recess between the rear and bottom surfaces of the vehicle seat, the cushion comprising a unitary core of resilient material of substantially L shape in vertical front-to-rear section, the lower leg of the core having a convex upper surface which merges smoothly with the front surface of the upper leg of the core to define the base of said triangular filler.

2. A cushion for use with a motor vehicle seat of the kind which comprises a back rest and bottom portion, the cushion including a unitary core of resilient material of a shape such as to have upright and substantially horizontal portions which have surfaces shaped respectively to conform to the exposed surfaces of the back rest and bottom portion of the vehicle seat and which form the rearwardly and downwardly converging faces of a triangular filler whose apex is designed to fit into the recess between the back rest and bottom portion of the vehicle seat, the upright and substantially horizontal portions of the core having forward and upper surfaces respectively which merge in a smooth concave curve to provide a shallow cavity for the reception of the sacral portion of the rider's back, said concavity constituting the base of the triangular filler.

3. A cushion for use with a motor vehicle seat of the kind which comprises a back rest and bottom portion, the exposed surfaces of the back rest and bottom portion both being convexly curved, the cushion including upright and substantially horizontal portions and having surfaces shaped to conform the exposed surfaces of the back rest and bottom portion of the vehicle seat, said cushion comprising a unitary core of foam rubber which is yieldingly resilient but which is shape-retaining, so that the upright portion of the cushion is self-sustaining and need not be attached to the back rest of the seat, said upright portion of the cushion having a forward surface defining a transversely extending smoothly curved, forwardly convex ridge designed to fit into the small of the user's back, the core being so shaped as to provide a filler of substantially triangular shape in front-to-rear section, having its apex directed rearwardly and downwardly to fit within the recess at the junction of the back rest and bottom portion of the vehicle seat.

References Cited in the file of this patent

UNITED STATES PATENTS

| 1,937,920 | Smith | Dec. 5, 1933 |
| 1,954,376 | Brueckl | Apr. 10, 1934 |
| 2,589,013 | Martin | Mar. 11, 1952 |

FOREIGN PATENTS

| 13,403/28 | Australia | Feb. 14, 1929 |